US007974635B2

United States Patent
Tiedeman et al.

(10) Patent No.: US 7,974,635 B2
(45) Date of Patent: Jul. 5, 2011

(54) METHOD AND SYSTEM FOR AUTOMATED COLLECTION OF CALL ROUTING PERFORMANCE DATA IN A WIRELESS NETWORK

(75) Inventors: Mark J. Tiedeman, Poway, CA (US); John Thomas Moring, Encinitas, CA (US); Daniel A. Lambert, Encinitas, CA (US); Khaled I. Dessouky, Studio City, CA (US)

(73) Assignee: TechnoCom Corporation, Carslbad, CA (US)

(*) Notice: Subject to any disclaimer, the term of this patent is extended or adjusted under 35 U.S.C. 154(b) by 608 days.

(21) Appl. No.: 12/133,317

(22) Filed: Jun. 4, 2008

(65) Prior Publication Data

US 2009/0305722 A1      Dec. 10, 2009

(51) Int. Cl.
*H04W 24/00* (2009.01)
*H04M 11/00* (2006.01)
*G06F 15/173* (2006.01)

(52) U.S. Cl. .......... 455/456.1; 455/408; 455/423; 709/224

(58) Field of Classification Search ............ 455/456.1
See application file for complete search history.

(56) References Cited

U.S. PATENT DOCUMENTS

| | | | |
|---|---|---|---|
| 2005/0020252 A1* | 1/2005 | Yang et al. | 455/415 |
| 2005/0101323 A1* | 5/2005 | De Beer | 455/435.2 |
| 2006/0165059 A1* | 7/2006 | Batni et al. | 370/352 |
| 2007/0050501 A1* | 3/2007 | Alston | 709/224 |

OTHER PUBLICATIONS

ATIS; ESIF Technical Report ATIS-0500009; High Level Requirements for End-to-End Functional Testing; 24 pp.

* cited by examiner

*Primary Examiner* — Lester Kincaid
*Assistant Examiner* — Andy Gu
(74) *Attorney, Agent, or Firm* — Christie, Parker & Hale, LLP

(57) ABSTRACT

A method and system for collecting location-sensitive call routing data in a wireless telecommunications network under test, the wireless network routing a test call to an appropriate destination based on a geographic area from which the test call was placed. The method and system include receiving the test call placed from a test call device to one or more destination devices, via said network under test; generating originator call records by the test call device; generating destination call records by the devices; electronically collecting originator call records from the test call device, destination call records from the one or more destination devices and network call records from said network under test; and storing said collected originator, destination call records, and network call records in a data collecting device; and organizing said call records such that the originator call records, the destination call records, and the network call records pertaining to the placed test call are associated together.

20 Claims, 12 Drawing Sheets

METHOD AND SYSTEM FOR AUTOMATED COLLECTION OF CALL ROUTING PERFORMANCE DATA IN A WIRELESS NETWORK

FIELD OF INVENTION

The present invention relates generally to the field of mobile wireless communication systems, more particularly the present invention provides a method and system for collecting test data to facilitate call routing performance verification.

BACKGROUND

The ability to route calls in wireline networks based on calling-party location has existed for many years. In such wireline communications networks with location-based call routing, the calling party's number serves as the basis for determining the caller's location since the station (e.g., telephone) used to place the call resides at a fixed location. For example, many businesses serve customers throughout the United States and other parts of the world. These businesses have call centers distributed in different geographic locations and desire to have the calls distributed across these call centers. One method used is to route calls to the appropriate call center based on the calling party's location. "Appropriateness" may be determined by geographic proximity, political boundaries, or other criteria.

Another example of location-based routing that has existed for many years is emergency calls. Most countries mandate that a particular dialed number (e.g., 911 in the United States, 112 in many countries in Europe, etc.) be reserved and used explicitly for emergency calls. Once an emergency call is initiated using the particular emergency number, the communications network routes the call to the appropriate emergency call center for handling.

Unlike wireline networks, in wireless communications networks, the calling station may be mobile and therefore does not necessarily have a fixed location over time. Therefore, the wireless communications network must determine the station's location at the time of the call and use that as the basis for routing.

In the United States, the entity responsible for terminating, handling and responding to emergency calls is known as a Public Safety Answering Point (PSAP). At present, there are over 6,000 PSAPs throughout the United States. Currently, to test proper enhanced 911 (E911) routing and the delivery of call-related information (e.g., the caller's location) to the PSAP, the wireless communications provider must coordinate, with each affected PSAP in its operating territory, a time in which one or more test calls can be made. At the scheduled time, a technician makes a 911 call from a location served by the wireless network that needs to be tested. The call is routed to a PSAP, and a PSAP operator fields the call. The technician identifies himself or herself as conducting a test 911 call. The PSAP operator identifies which PSAP they are at and looks to see that the location of the technician's call appears on their console. If the call is routed to the incorrect PSAP or the location of the technician's call is not delivered, this is deemed a failure and the technician records this for subsequent analysis and troubleshooting. The time required to conduct a single emergency test call can last several minutes depending on the experience level of the PSAP operator. Further, test calls may have to be rescheduled due to higher priority tasks that must be handled by the PSAP (e.g., fielding emergency calls).

Practices for performing such tests are documented in ATIS-0500009 High Level Requirements for End-to-End Functional Testing from The Alliance for Telecommunications Industry Solutions. This document provides a sample form to be used to record call data and results for each test call. The form includes Test Call Conditions, Test Call Data, Information to Record from PSAP Display, and Pass/Fail information.

The Test Call Conditions are recorded prior to the test, that is, not collected during the testing. This data includes identifiers of the network equipment (cellular mobile switching center [MSC], wireline switch/selective router, and cell/sector) and Emergency Services Routing Digits (ESRD).

The Test Call Data includes call time, answering PSAP identifier and attendant name. This data and the pass/fail information are entered by the calling test technician based on local observations (time, pass/fail) and information received orally from the answering party (PSAP information).

The Information to Record from PSAP Display includes a number of data items received at the PSAP from the network, and is again entered by the calling technician based on oral information from the answering PSAP operator.

Thus the typical process has the following attributes.
Data is collected and consolidated at the calling location.
Much of the data is collected orally over the wireless link.
The data collection is labor-intensive, time consuming, and prone to error.
Data is available only from persons at the calling and receiving ends, that is, no data is necessarily collected by the equipment itself, and no data is collected from any of the network equipment (cellular or wireline).

Wireless commercial location-based services which include routing calls to a destination based on the calling party's location are just beginning to emerge. The routing principles are, however, conceptually analogous to routing emergency calls.

One method of routing wireless calls is for the network to make the routing determination based on where the call enters the wireless network. Specifically, the location of the cellular base station (or other comparable wireless access point) antenna provides a gross estimate of the caller's position. For a sectorized base station with multiple antennas, the position estimate can be refined with knowledge of which sector the call originated on and the coverage area of each sector.

FIG. 1 shows a block diagram of a wireless communications network in which an emergency call is placed, according to prior art. Source devices 100, such as standard mobile handsets, are used by test personnel to place calls through the network 101. Rules 102 are used to allow the network to route the test calls to the correct destinations 103, for example Public Safety Answering Points. The test calls may utilize the actual emergency calling procedure (e.g., dial 911). Alternately a second set of rules is sometimes used (e.g., dial 922) so as to minimize the potential for impact on live emergency traffic. The rules are intended to route the calls to the proper destination, for example, the PSAP responsible for the area from which the call originated.

In any case, the data is then collected for post-processing. Test callers log their handset identification, calling time, calling location, and result of each call. The term "time" as used in this patent description refers to a specific and unique point in time. As such, it implicitly includes the date (month, day and year) as well as the specific time during the day. Call takers at the destinations may also log each call received, including handset identification, time, and any other data provided by the network, or alternately may provide this information orally to the test caller for logging. Test data can then be examined to evaluate network behavior.

Several problems are associated with the existing procedures.

Manually generated logs are subject to error. Not only can data be corrupted or lost through carelessness or oversight, but it is difficult for humans to accurately measure and capture certain metrics of interest, such as the exact duration from call request to call answer.

Tests are labor-intensive. Test callers are required as well as call-takers at the destinations. The availability of both test callers and call takers must be coordinated and scheduled in advance.

Testing can interfere with real emergency services, to the extent that the test calls share resources with live emergency calls. This is particularly true at the destinations, where communications trunks, call taking equipment, and human operators may be required to assume test functions while still servicing their primary functions. In the worst case, a call reporting a life-threatening emergency could be blocked by test calls. For this reason, it is often difficult to achieve the desired level of testing.

Test data is difficult to replicate. Because of difficulties in scheduling and performing tests, and collecting reliable data, comparative information on system performance over time is rarely available. This type of data could be used to predict system problems before they become critical.

Therefore, there is a need for a method and system for automatically collecting data for performing call routing performance verification.

SUMMARY

The present invention provides a method and system for collecting test data for use in verification of routing calls in a wireless communications network in which the calls' destinations are based, in part or in whole, on the calling party's location.

In some embodiments, the present invention is a method for collecting location-sensitive call routing data in a wireless telecommunications network under test, the wireless telecommunications network routing a test call to an appropriate destination based on a geographic area from which the test call was placed. The method includes: receiving the test call placed from a test call device to one or more destination devices, via said wireless telecommunications network under test; generating originator call records by the test call device; generating destination call records by the one or more destination devices; electronically collecting originator call records from the test call device; electronically collecting destination call records from the one or more destination devices; electronically collecting network call records including at least time, calling device identification, and network routing information from said network under test from the wireless telecommunications network under test; storing said collected originator, destination call records, and network call records in a data collecting device; and organizing said call records such that the originator call records, the destination call records, and the network call records pertaining to the placed test call are associated together.

In some embodiments, the present invention is a method for delivering test data in a wireless telecommunications network under test, the wireless telecommunications network routing a test call originated from a test call device to an appropriate destination device based on location of the test call device and establishing a call path between the test call device and said appropriate destination device. The method includes: electronically delivering destination call records including a digital representation of destination identification and network routing information from said appropriate destination device to said test call device over said call path.

In some embodiments, the present invention is a data collection device for collecting location-sensitive call routing data in a wireless telecommunications network under test, the wireless telecommunications network routing a plurality of test calls originated from a test call device to an appropriate destination device based on location of the test call device and establishing a call path between the test call device and said appropriate destination device. The device includes: a data communications interface for receiving originator call records from said test call device over said call path, for receiving destination call records from said appropriate destination device, and for receiving network call records from said wireless telecommunications network under test, wherein said originator call records include time and call status, said destination call records include time, calling device identification, and network routing information, and said network call records include time, calling device identification, and network routing information; a processor for associating particular originator call records and destination call records that refer to a particular test call; and a memory for storing the associate information.

In some embodiments, the present invention is a system for collecting location-sensitive call routing data in a wireless telecommunications network under test, the wireless telecommunications network routing a test call to an appropriate destination based on a geographic area from which the test call was placed. The system includes: a test call device for placing the test call and generating originator call records; a destination device for receiving the test call via said wireless telecommunications network under test and generating destination call records; a data collection device for collecting originator call records from the test call device, collecting destination call records from the destination device, storing said collected originator and destination call records, collecting network call records including at least time, calling device identification, and network routing information from the wireless telecommunications network under test, and organizing said call records such that the originator call records, the destination call records, and the network call records pertaining to the placed test call are associated together.

The network call records may include one or more of date, network identification, network device identification, routing rules, called number, routing rules invoked, call delivery status, call duration for successful calls, and failure reason for failed calls. The originator call records may include one or more of date, calling device identification, time, location, called number, called party information for successful calls, call duration for successful calls, and failure reason for failed calls. Also, the destination call records may include one or more of date, time, destination identification, test caller identification, test caller location, and call duration.

The communication network may be a voice communication network, a data communication network, or a cellular network.

DETAILED DESCRIPTION

Figure 1:
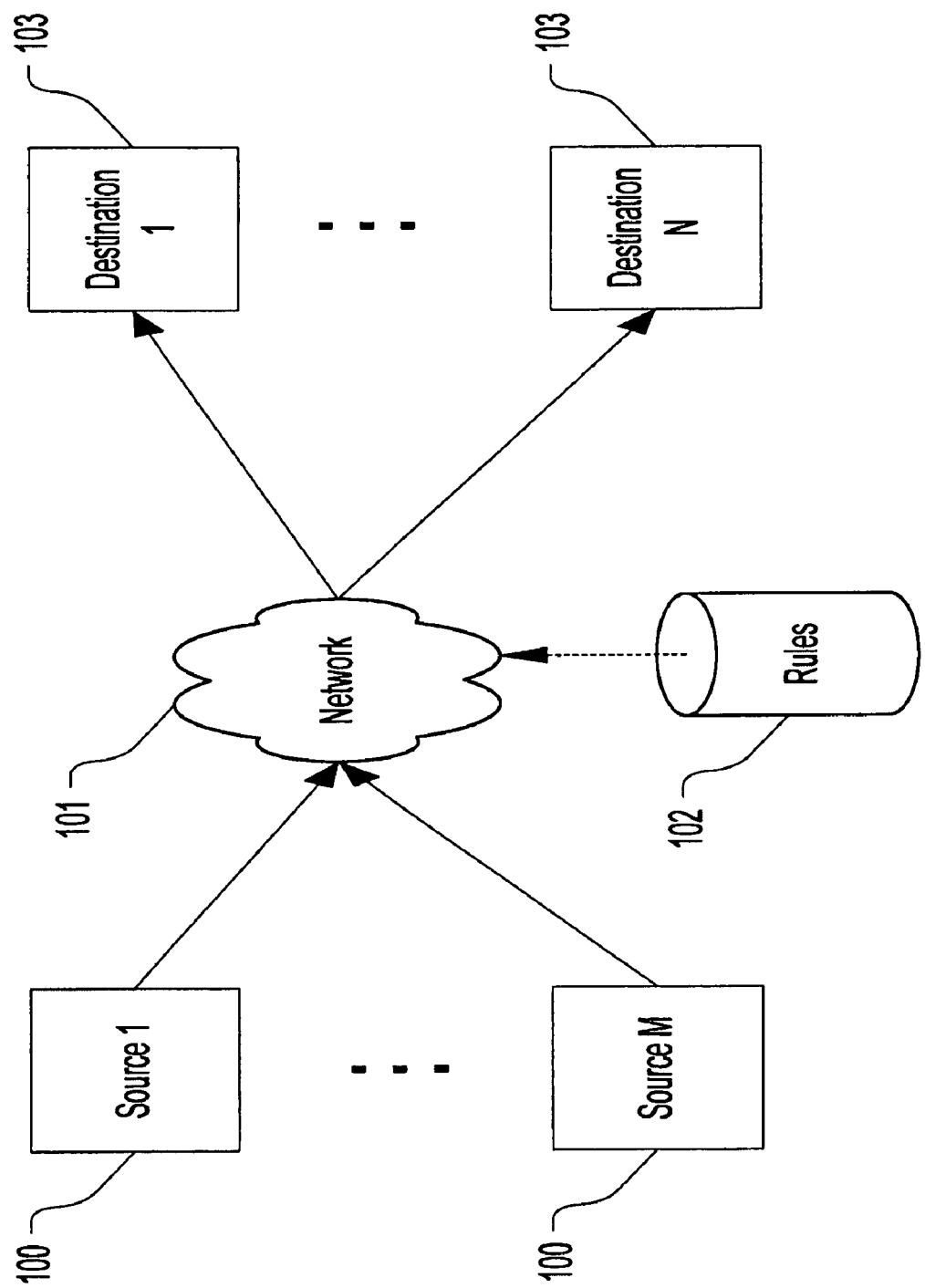
FIG. 1 shows a block diagram of a wireless communications network in which an emergency call is placed, according to prior art.
Figure 2:
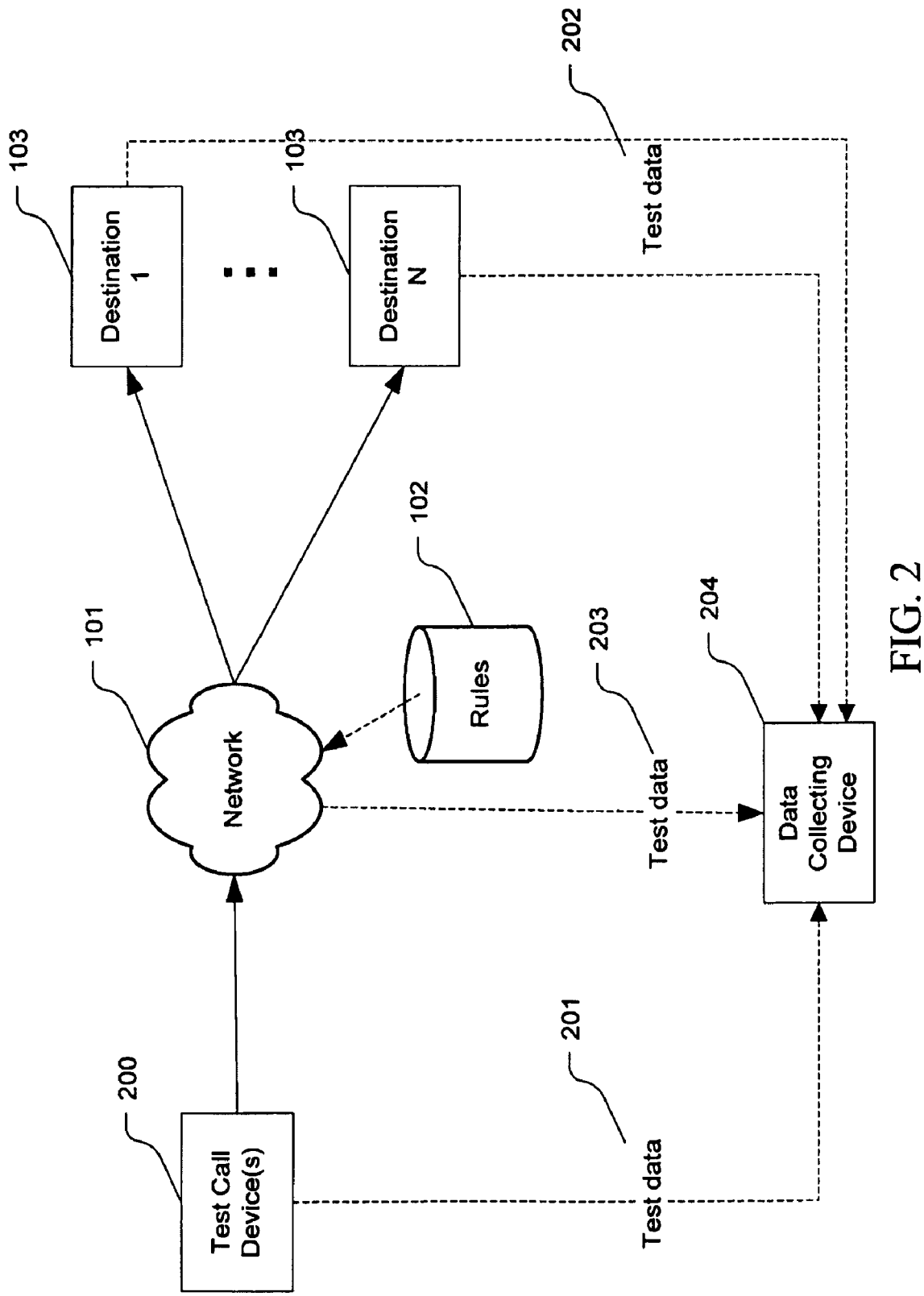
FIG. 2 illustrates an exemplary block diagram of a general system, according to some embodiments of the present invention.

FIG. 2 illustrates an exemplary block diagram of a general system, according to some embodiments of the present invention. Test call devices 200 are used to generate the test calls according to an automatic program. These devices including integrated computing and communications resources can accurately and consistently capture test data 201, organize it into call records, and provide it to a data collecting device 204. A call record is a predefined data structure that contains certain mandatory data items, and possibly additional optional data items, where the data items uniquely identify a test call and include information about the test call. The data collecting device 204 consolidates all test data for post processing. The test data includes test data 202 automatically retrieved from the destinations 103. The destination acts as the receiving end point of the test calls, automatically receiving or answering the arriving calls from the test call devices. The data collecting device may also query the network elements 101 or data bases for their test data 203.

It should be noted that these examples discuss the invention in the context of voice calls. However, the function of the invention is independent of the communications application, which could be an emergency voice call, a customer service voice call, a text or web-based data call and the like. Likewise, the network may include any communications technologies, including circuit switching, packet switching, or other transport technologies. Similarly, the wireless access technology is not limited to cellular, but is applicable to any wireless voice or data communication system with a known coverage area, including but not limited to short range technologies such as Wi-Fi, wide area technologies such as WiMAX, and satellite.

Figure 3:
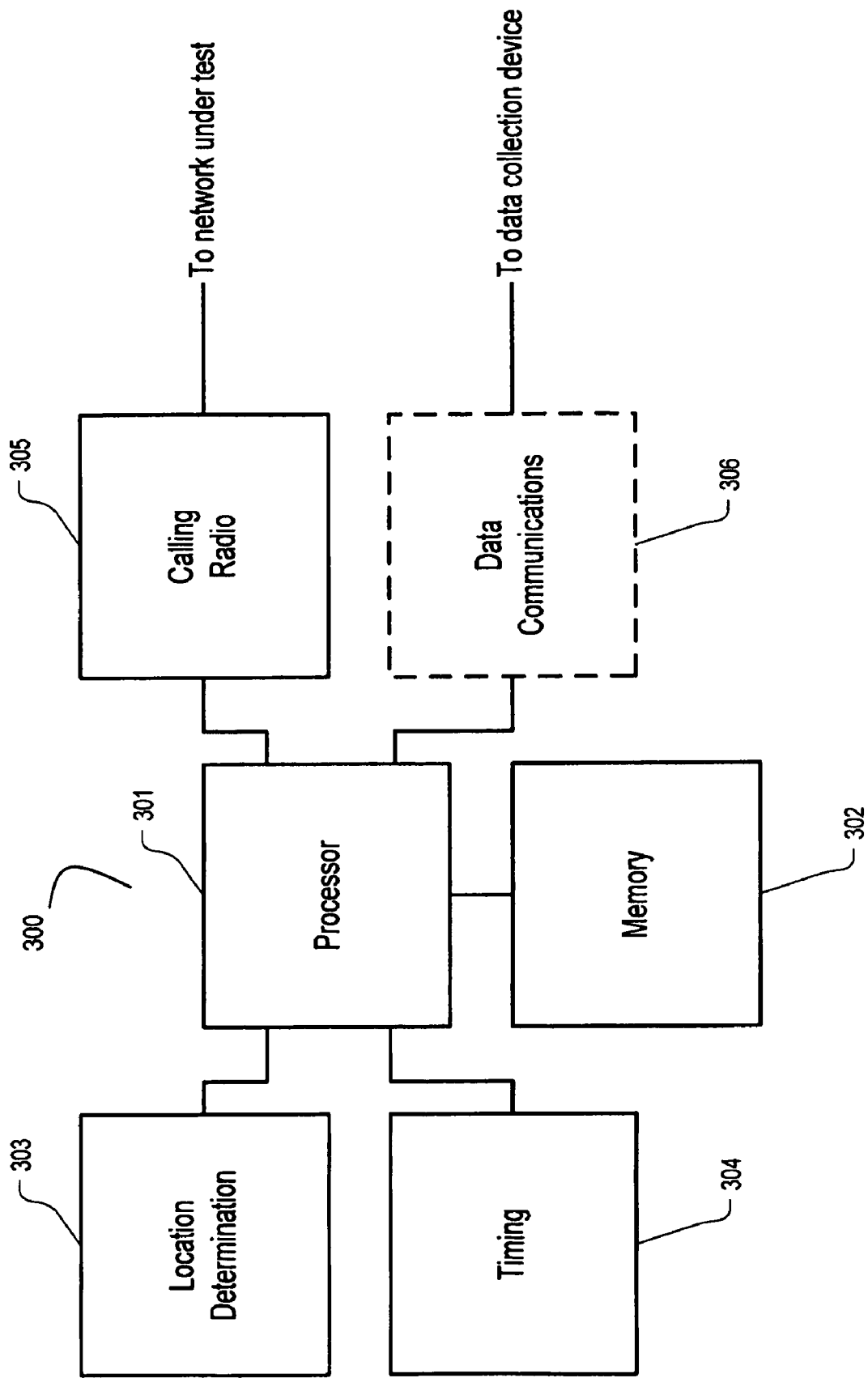
FIG. 3. illustrates an example of a test call device, according to some embodiments of the present invention.

An exemplary embodiment of a test call device 300 is illustrated in FIG. 3. Device 300 includes a processor module 301 that executes instructions that perform the functions described herein. The device may optionally include user interface components such as, a display, a mouse and a keypad, not shown for simplification of the drawings. Attached to the processor 301 is memory 302, which may include a combination of volatile (e.g., RAM) and non-volatile (e.g., disk, flash) memory. The memory 302 may include programmed instructions, configuration information such as, when to start a test and under what conditions to make a call, and logged test results. A timing module 304, such as an internal or external clock, provides time of day to the processor 301. Through the network, or through other means (e.g., local GPS module), the time base for the test call device 300 is preferably synchronized with the time base used in other parts of the system, as this facilitates the correlation of call data at the data collecting device. An optional location determination module 303 provides the current device location to the processor 301, if required for the type of testing being performed. Note that "location" may refer to the geographic position of the device, such as latitude and longitude derived from GPS. Alternate "location" techniques may be used, depending on system design. Specifically, in a Phase 1 E911 system, the caller location and therefore the call routing, is determined by the cellular base station and antenna sector serving the caller.

During a test, the test call device processor 301, per its instructions, places calls through the calling radio 305 which may be a cellular radio module. For each test call, the processor collects data, an example of which is shown in Table 1, below. The collected test data is delivered by the processor to the data collecting device (for example, 204 in FIG. 2), either in band through the calling radio 305 and network under test, or out of band through a separate data communications module 306 and an alternate data medium.

TABLE 1

Example Test Data at the Test Call Device

Per test data

Date
    Calling device identification
    Network identification

Originator call records

Time
    Location
    Called number

For failed calls:

Failure reason

For successful calls:

Call duration
    Answering party information (e.g., destination identification)

Figure 5:
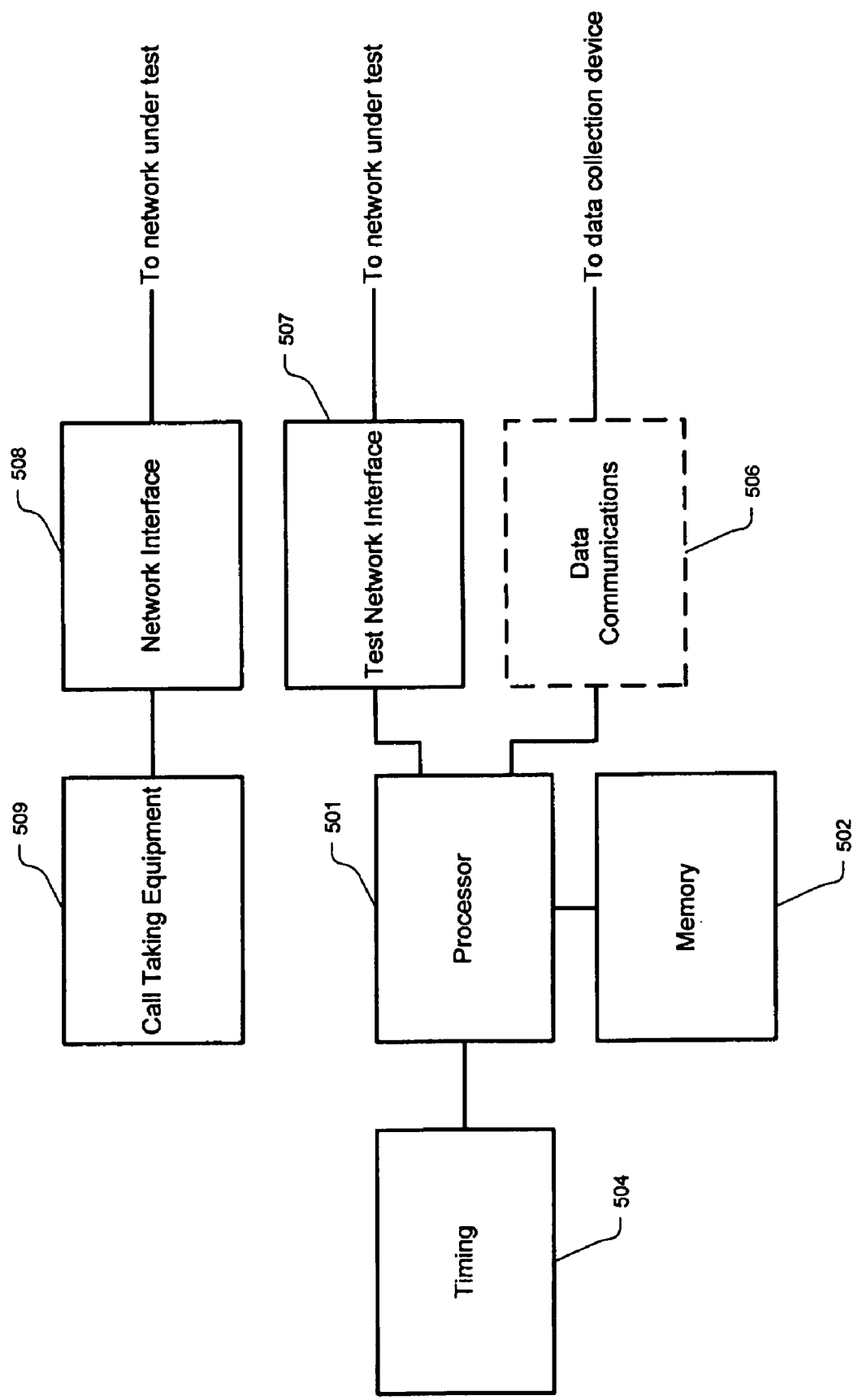
FIG. 5. illustrates an example of a destination equipment, according to some embodiments of the present invention.

FIG. 5. illustrates an example of a destination equipment, according to some embodiments of the present invention. The figure shows the call taking equipment 509 and network interface 508 as separate from the destination test equipment (processor 501, test network interface 507, etc.) In this embodiment, representing for example an emergency PSAP, this configuration may be desirable to prevent test calls from impacting live call resources. In other embodiments, the test equipment (501, 502, 504, and 506) and test network interface 507 may be integrated with the call taking equipment 509 and network interface 508 for cost savings and convenience.

The destination equipment includes call taking equipment 509, where live calls arrive from the network via the network interface 508. Additionally, the destination test equipment includes a processor module 501 that executes instructions that perform the testing functions. Optional user interface components such as display, mouse and keypad are not shown for simplification of the drawings. Attached to the processor 501 is memory 502, which may include a combination of volatile (e.g., RAM) and non-volatile (e.g., disk, flash) memory. Programmed instructions are stored in memory, as well as configuration information and logged test results. A timing module 504, such as an internal or external clock, provides time of day to the processor 501. During a test, test calls arrive over the test network interface 507. For each test call, the processor collects data, an example of which is shown in Table 2, below. Some data, for example time, is derived locally. Some data comes through the network interface, either directly from the test call device, or from the network itself. This latter class of data includes caller identification and location, and network routing information. Network routing information includes Emergency Services Routing Digits (ESRD), or Emergency Services Routing Key (ESRK). In other networks, other routing methods could be used, as well as other comparable classes of routing information. The collected test data is delivered by the processor to the data collection device 204, in band through the network under test, or out of band through a separate data communications module 506 and an alternate data medium.

TABLE 2

Test Data at the Destination Equipment

Per test data

Date
Destination identification
Destination call records

Time
Test call information (e.g., test caller identification,
network-determined test caller location,
test call device determined caller location [optional],
network routing information)
Call duration An example of the data available from the network is shown in Table 3 below, and may include an identification of the network (e.g., communications carrier) as well as network devices (e.g., switches, cellular site/sector) participating in the call, information on the routing performed, and the call status.

TABLE 3

Test Data at the Network

Per test data

Date
Network identification
Call routing rules
Network call records

Time
Calling device identification
Network device(s) identification
Called number
Routing rules invoked
Call delivery status
For failed calls:

Failure reason
For successful calls:

Call duration

Figure 4:
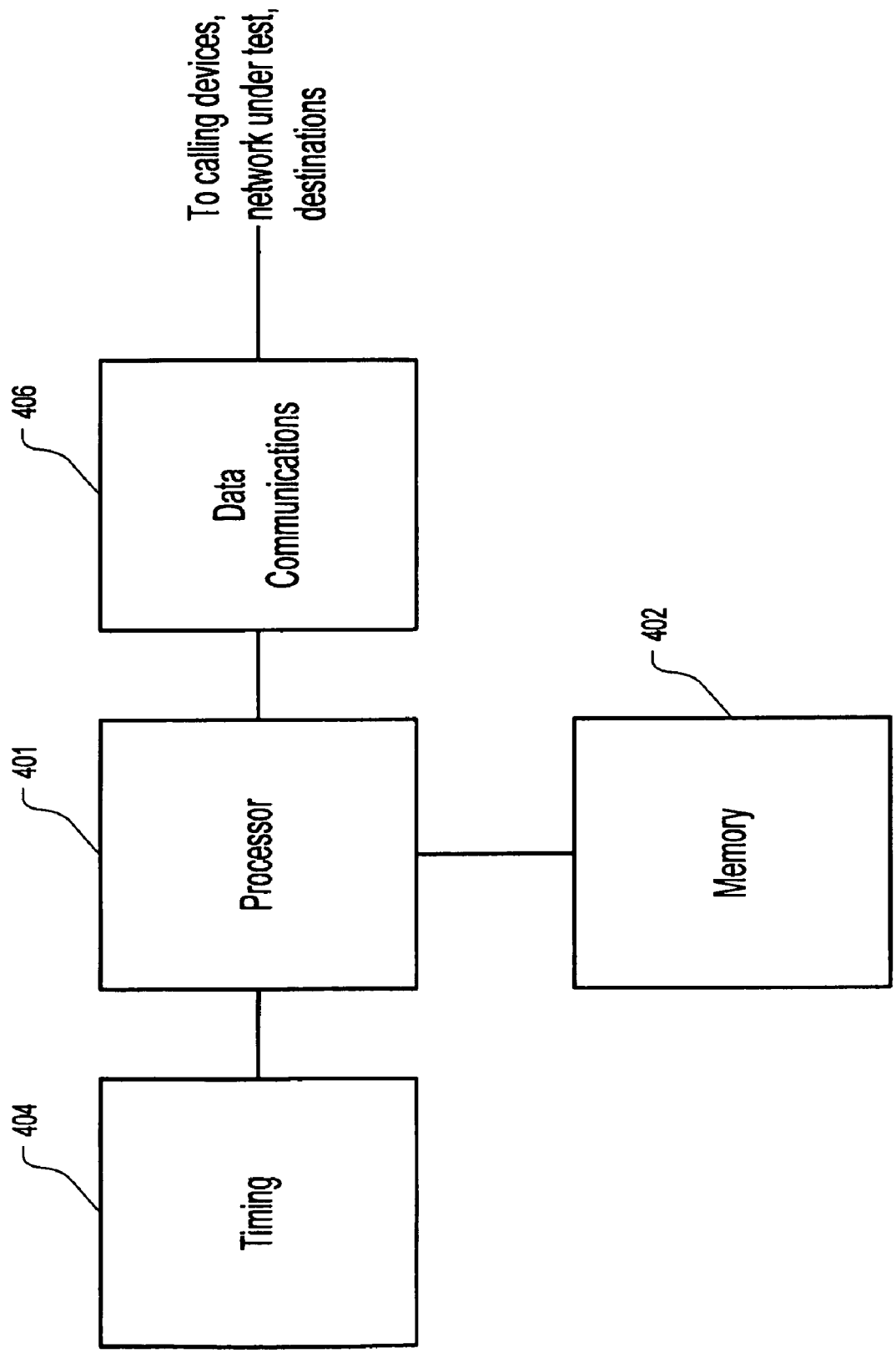
FIG. 4. illustrates an example of a data collecting device, according to some embodiments of the present invention.

FIG. 4. illustrates an example of a data collecting device, according to some embodiments of the present invention. The device includes a processor module 401 that executes instructions that perform the functions described here. Again, optional user interface components such as display, mouse and keypad are not shown for simplification of the drawings. Attached to the processor 401 is memory 402, which may include a combination of volatile (e.g., RAM) and non-volatile (e.g., disk, flash) memory. Programmed instructions are stored in memory, as well as configuration information and logged test results. A timing module 404, such as an internal or external clock, provides time of day to the processor 401. For each test, the processor collects data from test call devices 200 and destination test equipment 103, and optionally from the network 101.

The call records from the various devices are correlated based on date, time and test call device identification or other criteria. The test calls may then be analyzed and the network performance evaluated, for example, in terms of percentage of completed calls, times to deliver calls, and percentage of calls routed to the correct destination. The analysis may be performed automatically at the data collection device, or may be delivered to an external system for subsequent evaluation. Performance metrics of interest include those listed below.

| | | |
|---|---|---|
| Ratio of successful calls | Based on the number of calls received at the correct destination (based on caller location and routing rules) compared to the total number of placed calls | Note: certain failed attempts may be subtracted from the total number of placed calls for this calculation, e.g., attempts where the call was dropped by the wireless network before completion |
| Ratio of failed calls | Based on the number of call attempts unsuccessful for a specific reason (dropped by wireless network, blocked or terminated or not completed by wireline network, routed to incorrect destination, inadequate call quality, etc.) compared to the total number of placed calls | Note: depending on the aspect of the network being evaluated, calls with different failure types may be combined for this calculation. As above, certain failed attempts may be subtracted from the total number of placed calls for this calculation. |

In conjunction with numerical network performance calculations, the collected data includes information that can be used to debug the detected failures. In one embodiment, the ESRD/ESRK of a mis-routed call can be examined to determine whether the ESRD/ERSK was incorrectly allocated, or whether routing rules were incorrectly applied.

Figure 6:
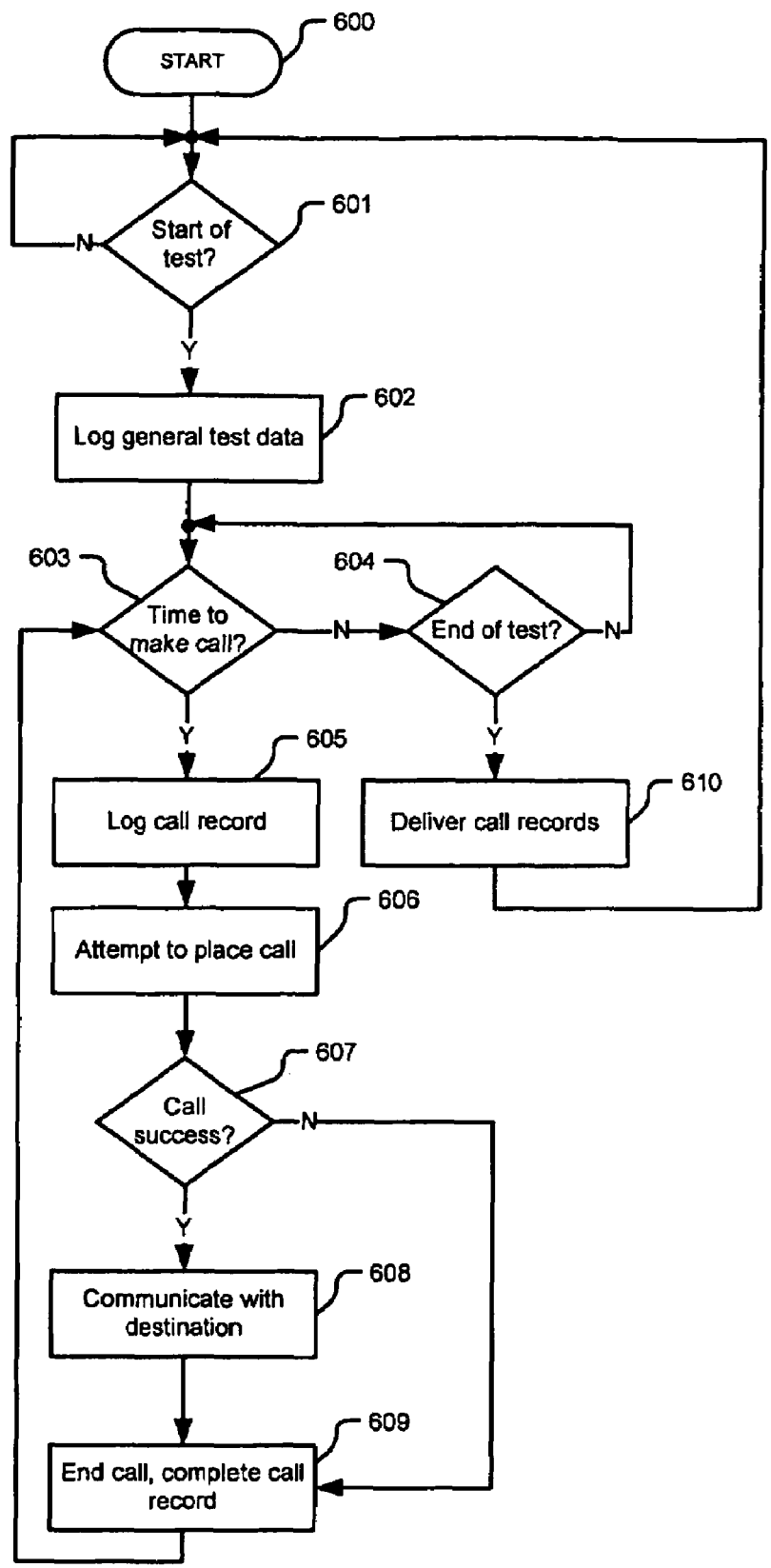
FIG. 6. illustrates an exemplary process flow diagram within a processor of the test call device, according to some embodiments of the present invention.

FIG. 6. illustrates an exemplary process flow diagram within the processor of the test call device, according to some embodiments of the present invention. Prior to operation 600, the device is programmed, turned on, and configured. At the start of a test 601, the device collects certain general test data 602, as illustrated in Table 1. The device then begins to make test calls 603 per its program and configuration. The device then starts to collect originator call records 605, including information such as the call time. For each call attempt 606, if the call succeeds 607, the device may optionally exchange data with the destination 608 before ending the call and completing the call data record 609. The exchange may involve the test call device collecting test call data from the destination device or sending test call data to the destination device. Alternately, if the call fails 607, the device immediately ends the call and completes the call record 609. After ending a call, the device is ready 603 to make the next call per its configuration. When the test is terminated 604, either per configuration or manually, the device returns to the ready state 601. Following the test completion, the test call device delivers collected call records 610 Deliver call records to the data collecting device. Alternately or in addition, the data may be delivered during the test, as it is collected.

Figure 7:
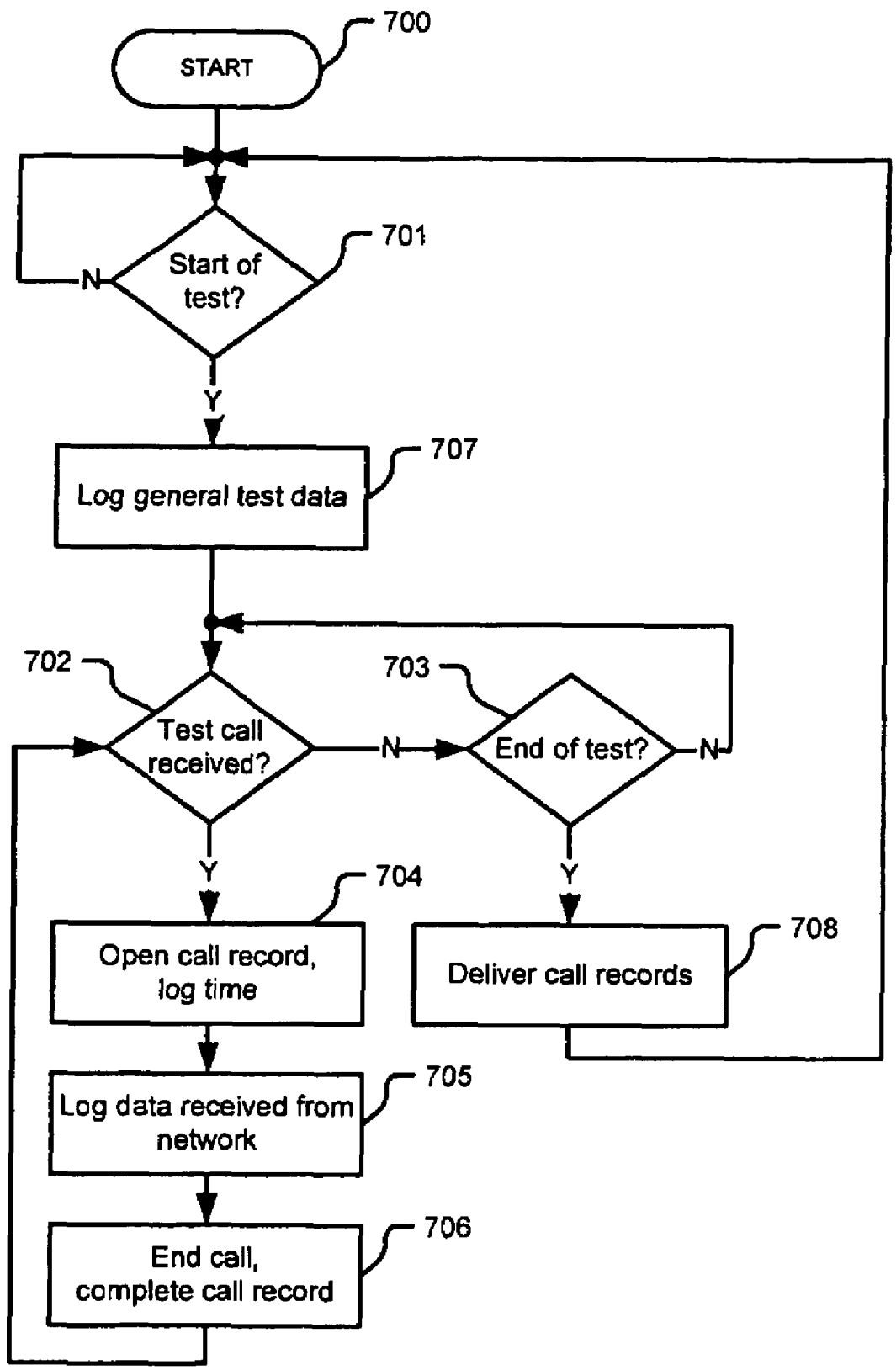
FIG. 7. illustrates an exemplary process flow diagram within a processor at the destination, according to some embodiments of the present invention.

FIG. 7. illustrates an exemplary process flow diagram within a processor at the destination, according to some embodiments of the present invention. Prior to operation 700, the device is programmed, turned on, and configured. At the start of a test 701, the device collects certain general test data 707 as illustrated in Table 2. The device than awaits incoming test calls 702. Once a test call is received, the device begins generating a destination call record, including information such as the call time 704, any available call data received from the network 705, and any available call data received from the test calling device. After ending a call 706, the device is ready 702 to receive the next call. When the test is terminated 703, either per configuration or manually, the device returns to the ready state 701. Following the test completion, the test call device delivers collected data 708 to the data collecting device. Alternately, the data could be delivered during the test as it is collected.

Figure 12:
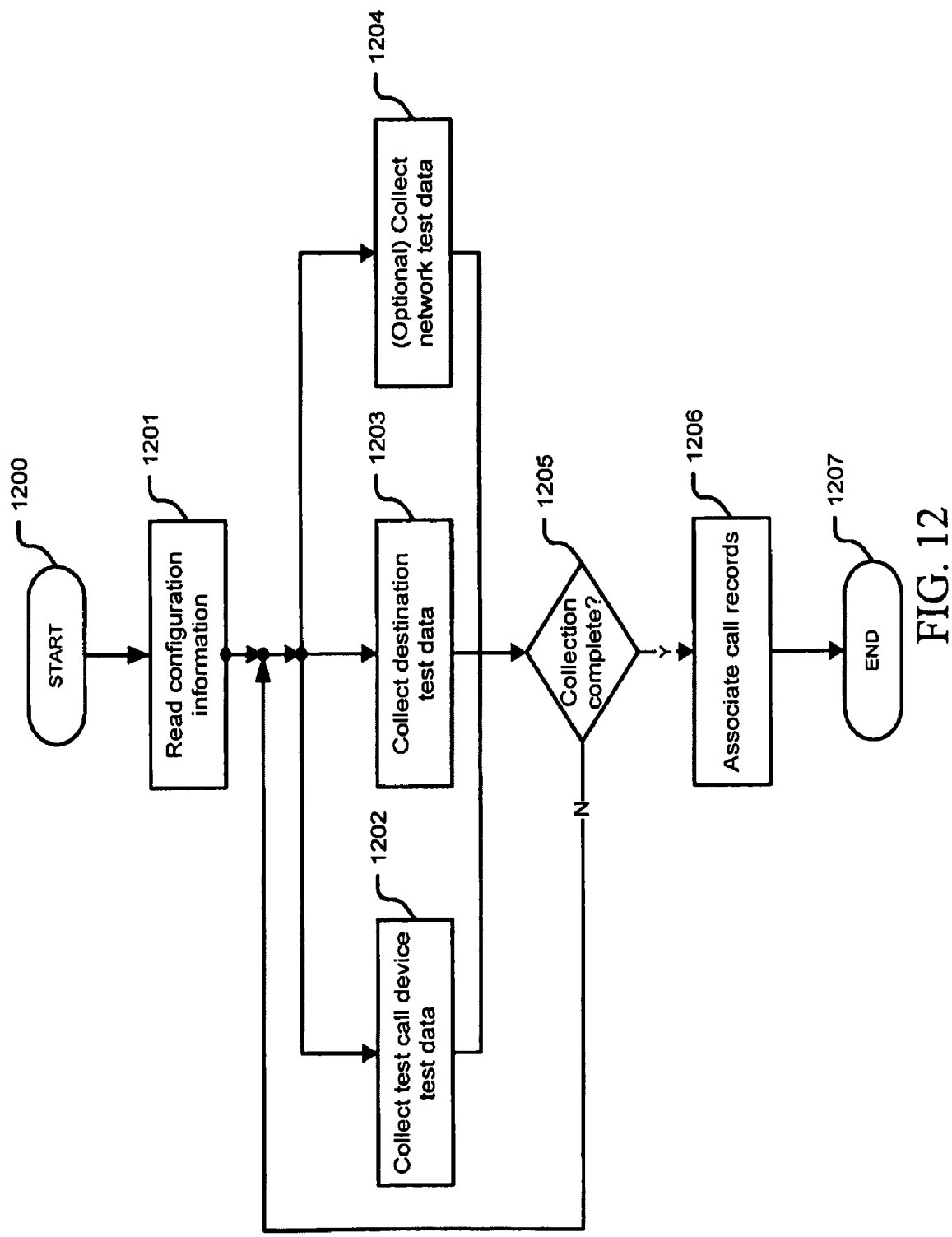
FIG. 12. illustrates an exemplary process flow diagram within a processor at the data collecting device.

FIG. 12. illustrates the processing flow within the processor at the data collecting device. At the start of a test activity 1200, the device reads 1201 predefined configuration information that determine the parameters of the current testing. Such information may include the types and addresses of devices from which to collect data, the data items expected, and the amount of data (e.g., number of call records or test duration). When the test data, including call records, becomes available from the various devices, it is collected 1202, 1203, 1204 at the data collecting device. The collecting may include one or more methods of data communication, such as polling the devices and receiving asynchronous reports on a per-call or per-test basis. Once data collection is complete 1205, the processor associates 1206 call records from different devices relating to the same call.

Association of call records includes identifying which test call record, destination call record and, optionally, network call record(s) belong to the same call. One method for doing so is for the test call device to transmit to the destination device a unique test call identifier (e.g., the concatenation of the test call device's identifier and its current time) to the destination device. Both devices would include the test call identifier in their respective call records. This method does not work for network records since the network does not learn of the test call identifier. Hence, another approach is to identify records having the same calling device identification within a reasonably close period of time. What is "reasonable" depends on several factors including the expected variance in time among the test call device, destination device and network devices, and the rate at which test calls from a given test call device are made. Two devices may each have relatively stable local clocks, but which are offset from each other. The association processing can recognize and compensate for this fact. Call order is also considered, such that for example if calling device call number N is associated with destination device call number M, then calling device call number N+1 is not associated with destination device call number M−1. When available, other data items including ESRD/ESRK, destination device identifier, etc., may be used to refine the call record association. This allows subsequent processing to evaluate the performance of the routing of test calls in the network during the execution of the test.

The operation of the invention may vary slightly depending on the nature of the network under test. Consider a network that routes a call based on the cellular base station, and possibly the sector within the base station, that serves the caller. This technique is often used to deliver emergency (e.g., 911) calls to the appropriate destination (PSAP). Calls from a sector serving an interstate highway might be routed to the highway patrol; calls from a sector serving the city center routed to the municipal police; and calls from a sector serving an unincorporated area routed to the county sheriff's office.

The call taker at the destination not only wants to receive properly-routed calls, but also wants to receive some indication of the mobile cellular caller's location. When precise geographic information, such as a GPS fix, is not available, the location of the cellular base station—or the location of a spot near the center of a sector's coverage area—can serve as an estimate of the caller's location. In practice, there are multiple ways to deliver this position estimate to the call taker.

The first method delivers the position estimate, or more likely just an identification of the serving cell/sector, in band with the delivered call. This is sometimes known as call associated signaling (CAS). The second method delivers the position estimate out of band from the delivered call. This is sometimes known as non call associated signaling (NCAS). An example of CAS is illustrated in FIG. 8, showing the network components, and FIG. 9, showing the information flow.

Figure 8:
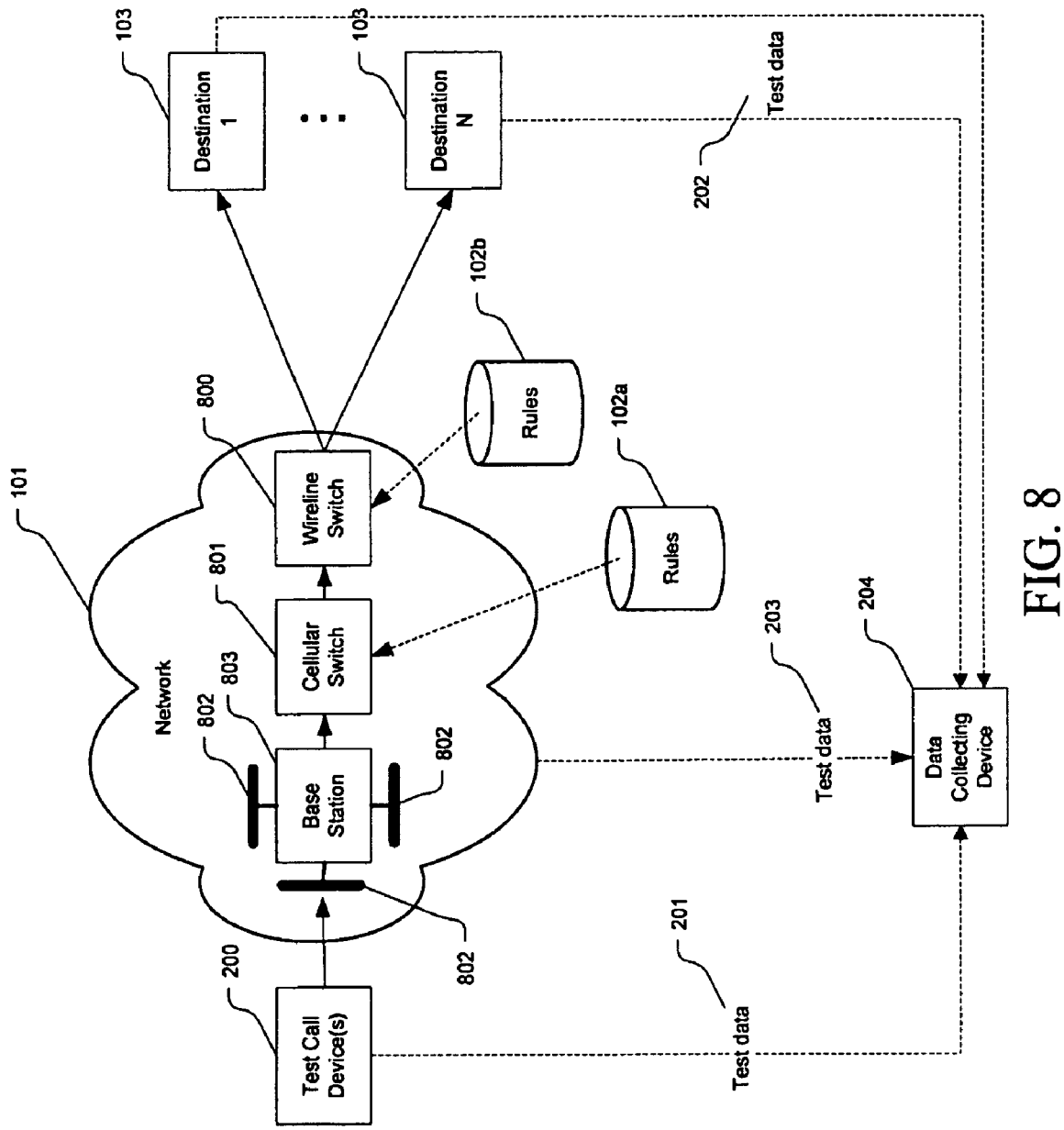
FIG. 8. illustrates an exemplary block diagram of a system applied to a network implementing call associated signaling, according to some embodiments of the present invention.

FIG. 8. illustrates an exemplary block diagram of a system applied to a network implementing call associated signaling (CAS), according to some embodiments of the present invention. The network routes a voice call originating on the cellular network, through the wireline network, to a destination PSAP 103, the routing being based on which cellular equipment services the call. The test call is placed by the test call device 200, which is designed to operate through the cellular network. Through standard cellular protocols, the call enters the cellular network via an antenna 802 at a cellular base station 803. The base station may have a single coverage area, or more commonly may support multiple geographic sectors through the use of directional antennas 802. From base station 803, the test call is passed to the serving cellular switch 801, along with an indication of the cell/sector. In this example, the cellular switch 801 accesses the rules data 102a that associates a routing number (such as emergency service routing digits, ESRD) with the call and passes the call and routing digits to the appropriate wireline switch 800. An ESRD is a 10 digit routable, but not necessarily dialable, number that is used for routing on a per origination cell sector basis. Wireline switch 800 accesses rules data 102b, and in turn delivers the test call over a trunk interface to the appropriate PSAP destination 103. The data collecting device, as before, collects test data 201, 202, 203 from the test call device(s), the destination(s), and if available from various network components.

Figure 9:
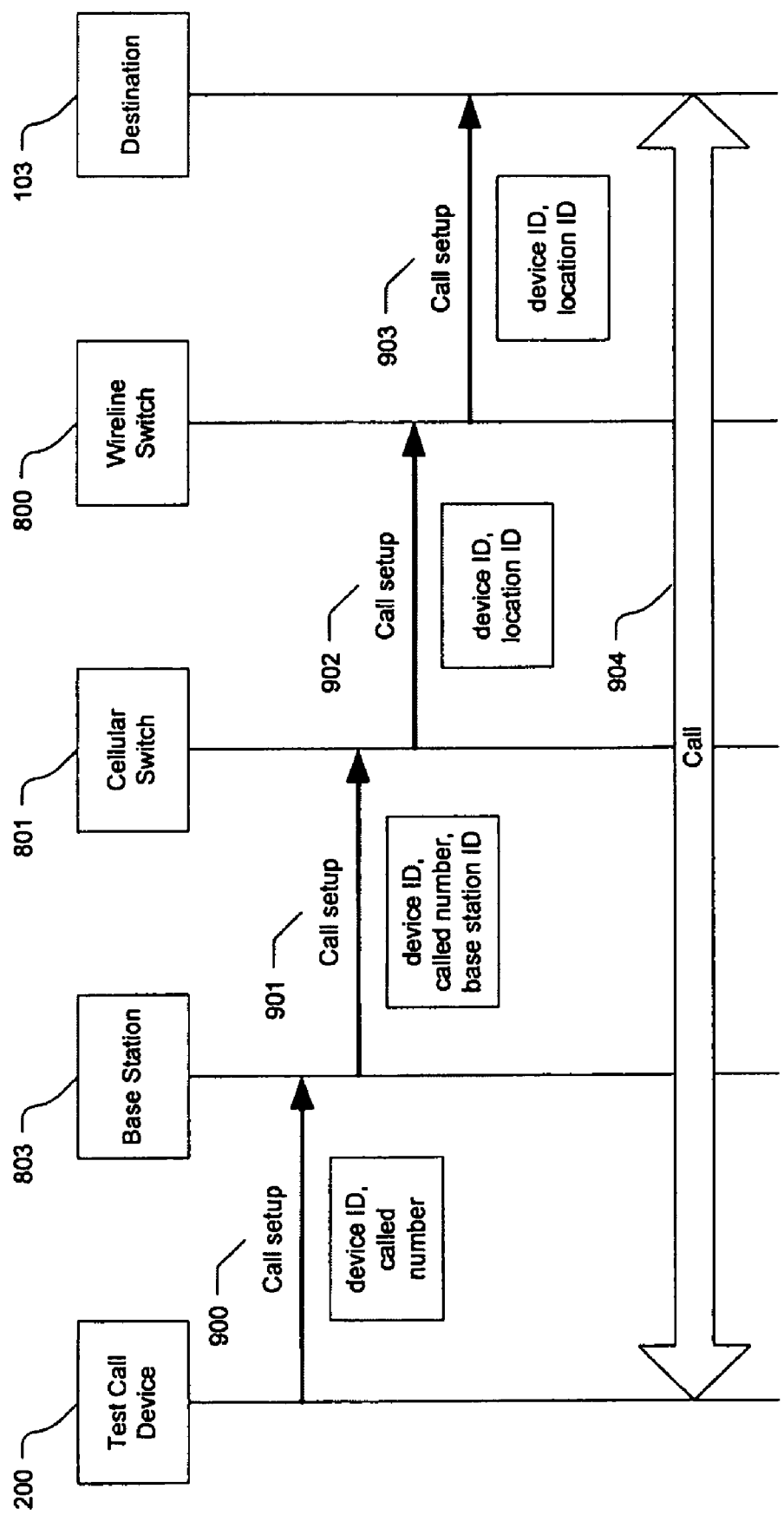
FIG. 9. illustrates an exemplary call flow diagram of a network implementing call associated signaling, according to some embodiments of the present invention.

FIG. 9. illustrates an exemplary call flow diagram of a network implementing call associated signaling, according to some embodiments of the present invention in a CAS call environment. The test call originates at the test call device 200, which has an associated identifier, its device ID. In practice, this may be the device's phone number, mobile identification number (MIN), Mobile Directory Number (MDN), International Mobile Equipment Identity (IMEI), International Mobile Subscriber Identity (IMSI), Internet Protocol (IP) address, or other identifier. Call setup signaling 900 is exchanged between the test call device and the cellular network, including device ID and the called number (such as 911). The cellular base station 803 has its own identifier, which identifies the base station and, if appropriate, the sector serving the call. The base station passes call setup information 901, including device ID and called number and an implicit or explicit indication of base station ID, through to the cellular switch 801.

Typically, the wireline switch 800 cannot process the base station ID in the form used within the cellular network. Thus, the cellular switch may access rules data (not shown) to map the cellular base station ID into a location ID of a form suitable for the wireline equipment. This form may be an ESRD mentioned previously. The cellular switch 801 passes call setup signaling 902, including the device ID and location ID, to the appropriate wireline switch 800, as determined by its rules data. The wireline switch in turn passes call setup signaling 903, including device ID and location ID, to the appropriate destination, as determined by its own rules data (not shown). Upon answer, the call 904 is in place through the network to the correct destination. The destination has knowledge of the identity of the calling device (device ID) and of the serving cell/sector (location ID). If desired, the destination can access a local or remote database (not shown) mapping location ID to a physical location such as address and/or latitude/longitude.

Optionally, the destination and test call device may exchange information over the call path. For example, the destination can deliver to the test call device its destination identity, for use in evaluating call routing accuracy. Likewise the calling device can deliver to the destination its own calling party identification and location (geographic, cell/sector, or other). Call path refers to an end-to-end information-carrying facility provided by the telecommunications system. In the context of an emergency services call, a call path is the voice circuit between the calling party and the emergency services operator, labeled 904 in FIG. 9. Digital information may be sent over this voice channel, for example, as DTMF tones, as a modulated signal, of by other methods. Information delivery over the call path is distinguished from information delivery over a signaling or ancillary data path. For example, in a cellular telephone call, caller ID is delivered by network equipment to the called (destination) equipment as part of the control information exchanged during call setup and thus is not sent over the call path. In some telecommunications systems, the call path is known as the bearer channel.

Tables 4 through 7 below show examples of the data collected by the invention for an exemplary embodiment in a scenario of CAS call routing by cell sector.

TABLE 4

Example Test Data at the Test Call Device for a CAS Environment

Per test data

Date
    Calling device identification (e.g., calling party number)
    Network identification
CAS originator call records Time
    Location (base station/sector determined via cellular signaling)
    Called number (911 or test number)
    Call delivery status
For failed calls:

Failure reason
For successful calls:

Call duration
    Destination information (e.g., PSAP identification if available)

TABLE 5

Test Data at the Destination Equipment for a CAS Environment

Per test data

Date
    Destination identification (PSAP identification)
CAS destination call records Time
Test call information Calling device identification (calling party number)
    Location identification (e.g., ESRD)
    Call duration

TABLE 6

Test Data at the Cellular Switch for a CAS Environment

Per test data

Date
    Network identification (e.g., service provider name)
    Cellular switch identification
    Call routing rules (cell sector/ESRD/wireline switch)
CAS wireless network call records Time
    Calling device identification (calling party number)
    Network device(s) identification
    (base station/sector, cellular switch)
    Called number (9-1-1 or test number)
    Routing rules invoked (ESRD, wireline switch)
    Call delivery status
For failed calls:

Failure reason
For successful calls:

Call duration

TABLE 7

Test Data at the Wireline Switch for a CAS Environment

Per test data

Date
    Network identification (e.g., service provider name)
    Wireline switch identification
    Call routing rules (ESRD/trunk)
CAS wireline network call records Time
    Calling device identification (calling party number)
    Routing rules invoked (ESRD/trunk)
    Call delivery status
For failed calls:

Failure reason
For successful calls:

Call duration

Figure 10:
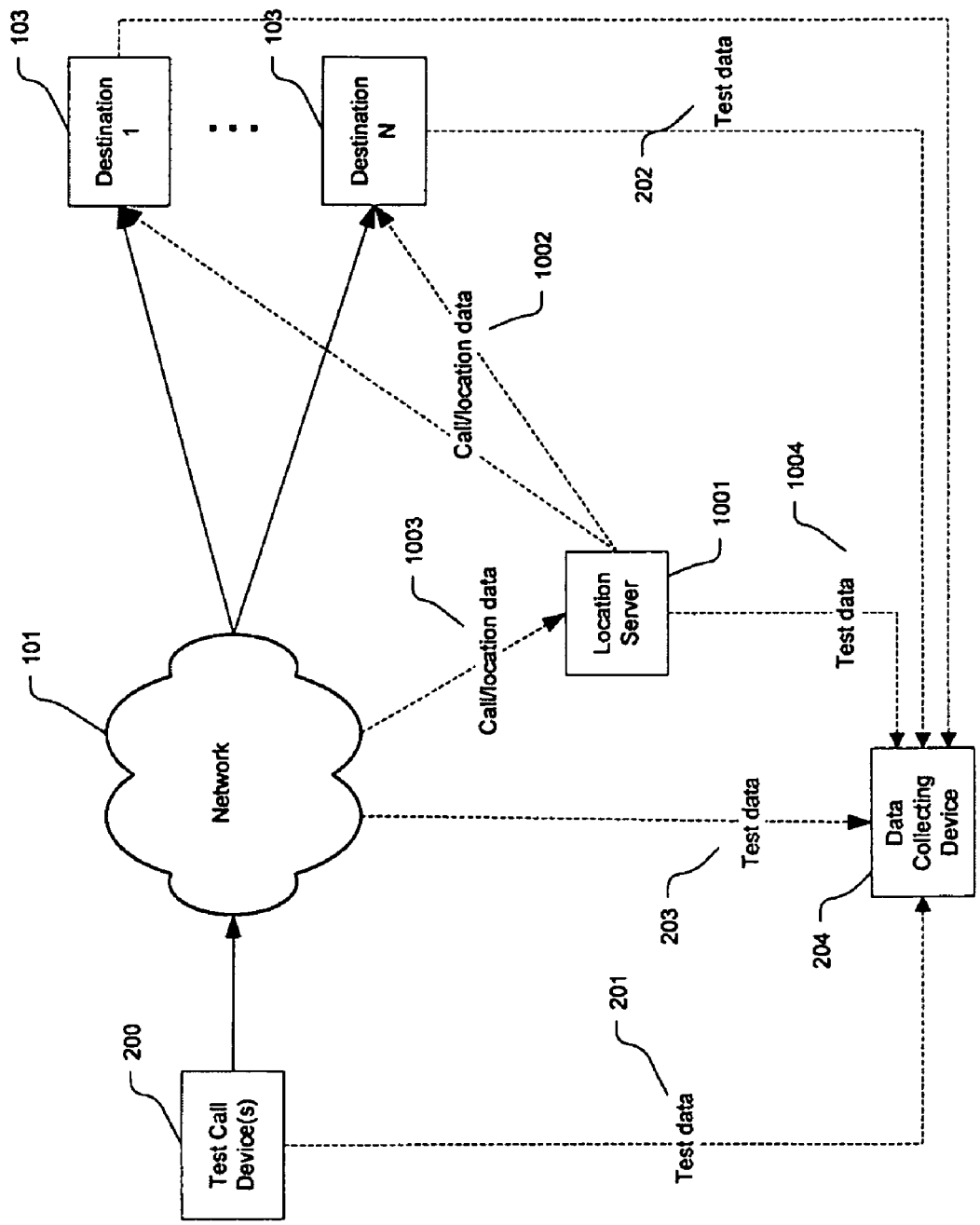
FIG. 10. illustrates an exemplary block diagram of a system applied to a network implementing non call associated signaling, according to some embodiments of the present invention.
Figure 11:
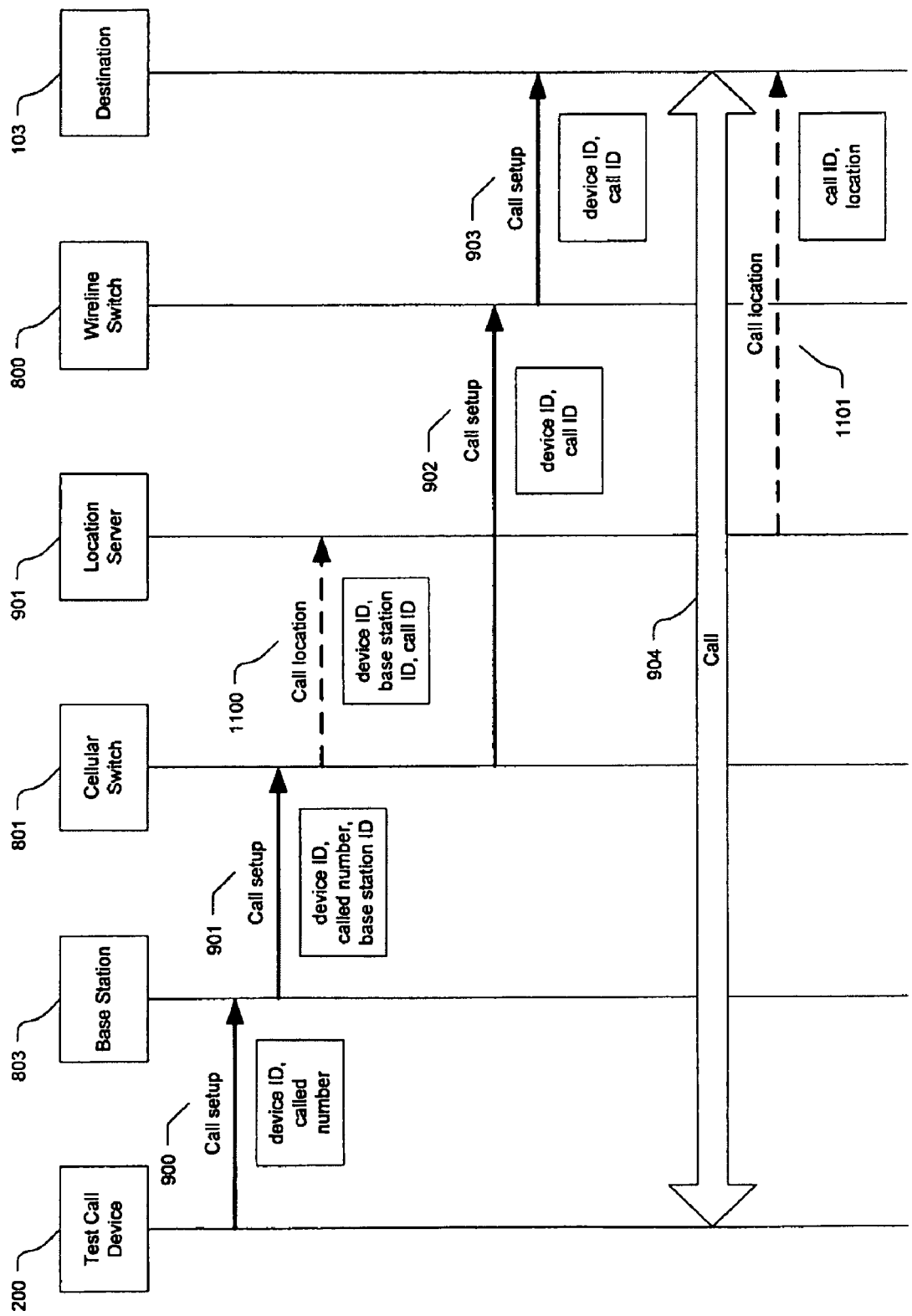
FIG. 11. illustrates an exemplary call flow diagram of a network implementing non call associated signaling, according to some embodiments of the present invention.

An example of NCAS is illustrated in FIG. 10, showing the network components, and illustrates an embodiment of the invention applied to the NCAS network. FIG. 11 shows the information flow associated with this embodiment.

FIG. 10. illustrates an exemplary block diagram of a system applied to a network implementing non call associated signaling, according to some embodiments of the present invention. FIG. 10 shows a network similar to that in FIG. 8, with the addition of a location server 1001. In some implementations, the server 1001 may be a mobile position center (MPC). The location server passes caller location information 1002 to the destination as described in the discussion of FIG. 11 below. The location server may also pass test data 1004 to the data collecting device 204.

FIG. 11. illustrates an exemplary call flow diagram of a network implementing non call associated signaling, according to some embodiments of the present invention. As depicted in FIG. 11 the test call again originates at the test call device 200, which has an associated device ID. As for CAS, call setup signaling 900, including device ID and the called number (such as 911), is exchanged between the test call device and the cellular network. The cellular base station 803 has its own base station ID, which identifies the base station and, if appropriate, the sector serving the call. As for CAS, the base station passes call setup information 901, including device ID and called number and an implicit or explicit indication of base station ID, through to the cellular switch 801.

At this point, the embodiments for NCAS diverge from those of CAS. The cellular switch, rather than looking up a location ID (e.g., ESRD), looks up or otherwise generates a call ID. Call ID, like the location ID used in CAS, is in a format compatible with the wireline switching equipment. However, it does not identify the originating base station, but rather identifies the current call. In practice, an emergency service routing key (ESRK) may be used as a call ID. An ESRK is a 10 digit routable, but not necessarily dialable, number that is used not only for routing but also as a key for mating of data that is provided to a PSAP by different paths, such as via the voice path and a network data path. Call location information 1100 such as the caller's device ID, the serving base station ID, and the call ID are passed to a location server 901 for later access. The location server typically has other methods, not shown, for determining the geographic position of the caller. For example, it may have a lookup of base station positions, or it may access a dynamically-calculated position of the calling device.

Additionally, the call setup process continues as for CAS with signaling 902 to the appropriate wireline switch 800, and from wireline switch to the appropriate destination 103, except that the call ID is passed rather than a location ID in the final call setup signaling 903. Finally, the destination may retrieve the caller's location 1101 from the location server, using the call ID as an index.

Tables 8 through Table 12 below show the data collected by the invention for an embodiment in a scenario of NCAS call routing by cell sector.

TABLE 8

Example Test Data at the Test Call Device for NCAS

Per test data

Date
    Calling device identification (calling party number)
    Network identification
NCAS originator call records Time
    Location (base station/sector determined via cellular signaling)
    Called number (911 or test number)
    Call delivery status
For failed calls:

Failure reason
For successful calls:

Call duration
    Destination information (e.g., PSAP identification if available)

TABLE 9

Test Data at the Destination Equipment for NCAS

Per test data

Date
    Destination identification (PSAP identification)
NCAS destination call records Time
    Test call information
        Calling device identification (calling party number)
        Test call identification (ESRK)
        Base station/sector identification/location
    Call duration

TABLE 10

Test Data at the Cellular Switch for NCAS

Per test data

Date
    Network identification (e.g., service provider name)
    Cellular switch identification
    Call routing rules (base station/sector/ESRK/wireline switch)
NCAS wireless network call records Time
    Calling device identification (calling party number)
    Network device(s) identification (base station/sector)
    Called number (911 or test number)
    Routing rules invoked (ESRK assignment, wireline switch)
    Call delivery status
For failed calls:

Failure reason
For successful calls:

Call duration

TABLE 11

Test Data at the Location Server for NCAS

Per test data

Date
    Server identification
NCAS location network call records

Time
    Calling device identification (calling party number)
    Call identification (ESRK)
    Call location status
For failed calls:

Failure reason
For successful calls:

Caller location

TABLE 12

Test Data at the Wireline Switch for NCAS

Per test data

Date
    Network identification (e.g, service provider name)
    Wireline switch identification
    Call routing rules (ESRK/trunk)

TABLE 12-continued

Test Data at the Wireline Switch for NCAS

NCAS wireline network call records

Time
    Calling device identification (calling party number)
    Routing rules invoked (ESRK/trunk)
    Call delivery status
For failed calls:

Failure reason
For successful calls:

Call duration

Note that the test data available in a given system implementation will likely vary from that shown in the preceding tables. For example, switches might not allow access to their log files; and test call devices may not log the serving base station identification. Thus the data collecting device will be configured to accept the available data, and to associate the data from the various devices on a per call basis. Also, network variants wherein a mixture of CAS and NCAS signaling may exist. Those skilled in the art may effect variations and alterations of the embodiments described above without departing from the scope of the invention.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for collecting location-sensitive call routing data in a wireless telecommunications network under test, the method comprising:

automatically placing a test call from a test call device according to a configuration file, wherein the configuration file includes instructions for when to place the test call, under what condition to place the test call, when to collect data, and under what condition to collect data;

routing said automatically placed test call by said wireless telecommunications network under test to one or more appropriate destination devices, based on a geographic area from which the test call is placed;

receiving the test call by said one or more destination devices, via said wireless telecommunications network under test;

generating originator call records by the test call device;

generating destination call records by the one or more destination devices;

electronically collecting originator call records from the test call device;

electronically collecting destination call records from the one or more destination devices;

electronically collecting network call records including at least time, calling device identification, and network routing information from said network under test from the wireless telecommunications network under test;

storing said collected originator call records, destination call records, and network call records in a data collecting device; and organizing said call records such that the originator call records, the destination call records, and the network call records pertaining to the placed test call are associated together.

2. The method of claim 1, wherein the network call records further include one or more of date, network identification, network device identification, routing rules, called number, routing rules invoked, call delivery status, call duration for successful calls, and failure reason for failed calls.

3. The method of claim 1, wherein the originator call records include one or more of date, calling device identification, time, location, called number, called party information for successful calls, call duration for successful calls, and failure reason for failed calls.

4. The method of claim 1, wherein the destination call records include one or more of date, time, destination identification, test caller identification, test caller location, and call duration.

5. The method of claim 1, further comprising receiving a non-test call by the one or more destination devices.

6. The method of claim 1, further comprising placing a plurality of additional test calls and electronically collecting corresponding originator call records and destination call records, wherein the association of call record includes identifying which originator call record and destination call record belong to the test call, using a unique test call identifier.

7. The method of claim 1, further comprising placing a plurality of additional test calls and electronically collecting corresponding originator call records, destination call records and network call records, wherein the association of call record includes identifying which originator call record, destination call record and network call record belong to the test call, using the calling device identification and call time.

8. The method of claim 1, wherein the originator call records are collected by the data collecting device over the network under test.

9. The method of claim 1, wherein the originator call records are collected by the data collecting device over a communications medium separate from the network under test.

10. The method of claim 1, wherein the destination call records are collected by the data collecting device over the network under test.

11. The method of claim 1, wherein the destination call records are collected by the data collecting device over a communications medium different from the network under test.

12. The method of claim 1, further comprising: placing a test call from the test call device and said one or more destination devices; and electronically delivering the originator call records from said test call device to said one or more destination devices over a resulting call path.

13. The method of claim 1, wherein the communication network is a voice communication network, a data communication network, or a cellular network.

14. A data collection device for collecting location-sensitive call routing data in a wireless telecommunications network under test, comprising:

a test call device for automatically placing a plurality of test calls according to a configuration file, wherein the configuration file includes instructions for when to place each test call, under what condition to place the test call, when to collect data, and under what condition to collect data, and wherein the wireless telecommunications network is configured to route said plurality of test calls to an appropriate destination device based on location of the test call device and establish a call path between the test call device and said appropriate destination device;

a data communications interface for receiving originator call records from said test call device over said call path, for receiving destination call records from said appropriate destination device, and for receiving network call records from said wireless telecommunications network under test, wherein said originator call records include time and call status, said destination call records include time, calling device identification, and network routing information, and said network call records include time, calling device identification, and network routing information;

a processor for associating particular originator call records and destination call records that refer to a particular test call by using a unique test call identifier other than a call number for the originator or the destination device; and a memory for storing the associated information to be utilized for evaluating the performance of the routing of test calls in said wireless telecommunications network.

15. A system for collecting location-sensitive call routing data in a wireless telecommunications network under test, comprising:

a test call device for automatically placing the test call, according to a configuration file, wherein the configuration file includes instructions for when to place each test call, under what condition to place the test call, when to collect data, and generating originator call records;

a destination device for receiving the test call via said wireless telecommunications network under test and generating destination call records; and a data collection device for collecting originator call records from the test call device, collecting destination call records from the destination device, storing said collected originator and destination call records, collecting network call records including at least time, calling device identification, and network routing information including Emergency Services Routing Digits (ESRD), or Emergency Services Routing Key (ESRK), from the wireless telecommunications network under test, and organizing said call records such that the originator call records, the destination call records, and the network call records pertaining to the placed test call are associated together, wherein the wireless telecommunications network routes a test call to an appropriate destination based on a geographic area from which the test call was placed and some stored emergency call routing rules.

16. The system of claim 15, wherein the network call records further include one or more of date, network identification, network device identification, routing rules, called number, routing rules invoked, call delivery status, call duration for successful calls, and failure reason for failed calls.

17. The system of claim 15, wherein the originator call records include one or more of date, calling device identification, time, location, called number, called party information for successful calls, call duration for successful calls, and failure reason for failed calls.

18. The system of claim 15, wherein the destination call records include one or more of date, time, destination identification, test caller identification, test caller location, and call duration.

19. The system of claim 15, wherein the wireless telecommunications network is a cellular network.

20. The system of claim 15, wherein the test call device delivers the originator call records from said test call device to said one or more destination devices over a call path established as a result of the placed test call.

* * * * *